Sept. 9, 1930.    R. R. BLOSS ET AL    1,775,628
WALKING BEAM BEARING
Filed April 10, 1928

INVENTOR.
Richard R. Bloss
Elmer B. Maurer.
Sylvester B. Creamer.
BY
ATTORNEY

Patented Sept. 9, 1930

1,775,628

UNITED STATES PATENT OFFICE

RICHARD R. BLOSS, ELMER B. MAURER, AND SYLVESTER B. CREAMER, OF COLUMBUS, OHIO, ASSIGNORS TO THE INTERNATIONAL DERRICK & EQUIPMENT COMPANY, OF COLUMBUS, OHIO, A CORPORATION OF OHIO

WALKING-BEAM BEARING

Application filed April 10, 1928. Serial No. 268,939.

Our invention relates to walking beam bearings and has particular reference to walking beam bearings wherein a means is provided for efficient and continuous lubrication of the bearings in which the trunnions of the walking beam of an oil well drilling or pumping mechanism oscillates.

Most walking beam bearings, in use at the present time, have the disadvantage of requiring the frequent application of lubricant by a workman. This is due to the fact that the only means for lubricating such bearings is by way of an oil hole in the cap of the bearing into which the lubricant must be frequently placed and allowed to seep down over the trunnions of the walking beam saddle. No means has hitherto been provided for preventing the lubricant from seeping out of the ends of the bearings. This has resulted in the friction between the bearings and the trunnions being increased and the life of the bearing thereby materially shortened.

The disadvantage of having a bearing in which no means is provided for continuous lubrication over a relatively long period of time has been made more noticeable for the reason that the walking beam bearings are usually mounted at a height, above the ground, of approximately twice or three times the average man's height. This has required frequent climbing on the part of the workman and has made the bearing so inaccessible as to cause the workman to frequently neglect to lubricate the bearing. In some instances, a platform and stairway have been provided in order to permit the workman to safely lubricate the walking beam bearing but this has the disadvantage of being more or less expensive.

One of the objects of our invention is to so construct the walking beam bearing that it will be efficiently and continuously lubricated over a relatively long period of time. Other objects of our invention may be seen in the following detailed description.

The preferred embodiment of our invention may be seen in the accompanying drawings wherein similar characters of reference designate corresponding parts and wherein.

Figure 1:
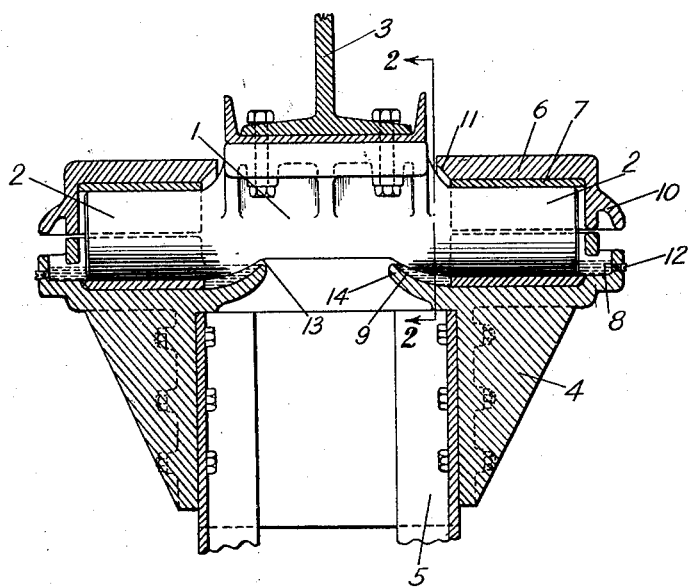
Figure 1 is a sectional view of a walking beam bearing constructed in accordance with our invention.
Figure 2:
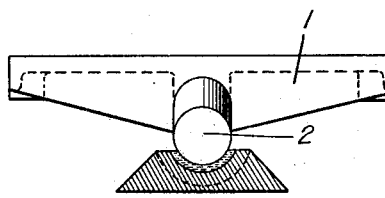
Figure 2 is a sectional view of the walking beam bearing taken on the line 2—2 of Figure 1.
Figure 3:
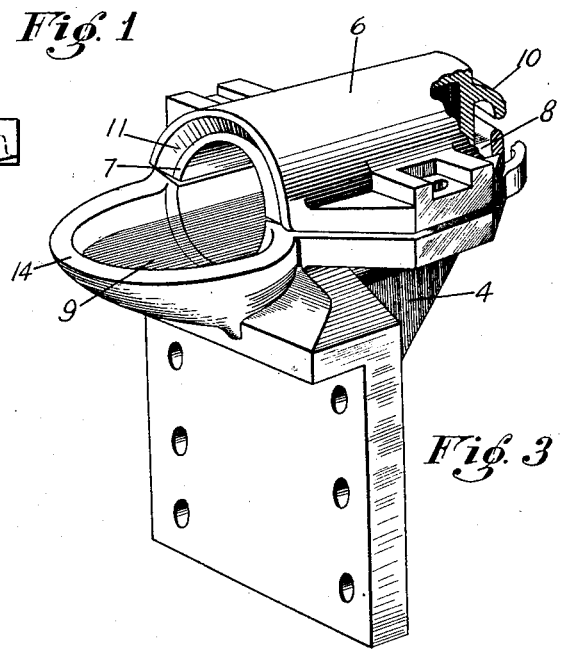
Figure 3 is a perspective view of one of the side irons which make up the walking beam bearing.

With reference to Figures 1 and 2 of the drawings, we have shown a walking beam saddle 1 having the trunnions 2 mounted on opposite sides thereof. A walking beam 3 is rigidly attached to the walking beam saddle 1 as is shown in Figure 1.

The respective trunnions 2 of the walking beam saddle 1 are supported in side irons 4 which are independently and rigidly attached to the Samson post 5.

Each of the side irons 4 is made up of two pieces, namely, the base portion which forms the bearing support for the trunnion 2 of the walking beam saddle 1 and a cap 6 which forms the top part of the walking beam bearing and serves to prevent displacement of the trunnions 2 and also to prevent water and foreign substances from accumulating in the bearing. The bearing support and the cap are lined with the usual Babbitt metal 7.

The lower or base portions of each walking beam bearing 4 are so constructed as to provide oil reservoirs 8 and 9 on opposite sides thereof. Each bearing cap 6 is provided with a shield 10 which extends outwardly over the oil reservoir 8 and prevents water and foreign substances from having access to the oil in the reservoir at this location and the inside edge of each bearing cap 6 is provided with an extension 11 which serves to prevent water or foreign substance from having access to the oil reservoir 9 at this location. A means for draining each oil reservoir 8 is provided by the removable plug 12.

Referring to Figure 1 of the drawings, it will be seen that the trunnions 2 of the saddle 1 have an inverted depression 13 therein. With such construction, the trunnions will ride in the bearings as shown and the saddle itself will clear the lips 14 of the side irons hereinbefore described.

An advantageous feature of our invention will be seen in Figure 1 wherein it will be noted that each oil reservoir 8 is higher than each oil reservoir 9. It will be understood that, when oil is put in each oil reservoir 8, the oil will be forced through between the trunnion and the surface of the bearing until the level of the oil in the reservoir 9 of a side iron is the same as that in the reservoir 8 thereof.

With reference to the preceding description and the drawings attached hereto, it will be apparent that we have retained the necessary flexibility and adjustment of our walking beam bearing by providing a bearing which consists of two units. It will also be apparent that we have eliminated all of the disadvantageous features in connection with the lubricating of these parts.

Various changes may be made in the details of our invention without departing from the scope thereof.

Having thus described our invention, what we claim is:

1. A walking beam center support comprising a walking beam saddle having trunnions on the opposing sides thereof, spaced side irons having base portions which form a bearing support for said trunnions, cap members forming the tops of such bearings, the bearing support for each trunnion having an oil reservoir at each end, two of said oil reservoirs being positioned at a higher level than the others, and shields for the oil reservoirs at the higher level.

2. A walking beam center support comprising a walking beam saddle having trunnions on the opposing sides thereof, spaced side irons having base portions which form a bearing support for said trunnions, cap members forming the tops of such bearings, the bearing support for each trunnion having an oil reservoir at each end, two of said oil reservoirs being positioned at a higher level than the others, and shields for the oil reservoirs at the higher level, said shields being disposed on said cap members.

3. A walking beam center support comprising a walking beam saddle having trunnions on the opposing sides thereof, spaced side irons having base portions which form a bearing support for said trunnions, cap members forming the tops of such bearings, the bearing support for each trunnion having an oil reservoir at each end, two of said oil reservoirs being positioned at a higher level than the others, and shields for the oil reservoirs at the higher level, said shields being formed integrally with said cap members.

In testimony whereof they hereto affix their signatures.

RICHARD R. BLOSS.
ELMER B. MAURER.
SYLVESTER B. CREAMER.